G. H. RIEHL & W. HONEGGER.
TYPOGRAPHICAL GAGE.
APPLICATION FILED APR. 9, 1909.

989,512.

Patented Apr. 11, 1911.

UNITED STATES PATENT OFFICE.

GEORGE H. RIEHL AND WERNER HONEGGER, OF CINCINNATI, OHIO.

TYPOGRAPHICAL GAGE.

989,512.     Specification of Letters Patent.     Patented Apr. 11, 1911.

Application filed April 9, 1909. Serial No. 489,021.

*To all whom it may concern:*

Be it known that we, GEORGE H. RIEHL and WERNER HONEGGER, citizens of the United States, residing at Cincinnati, in the county of Hamilton and State of Ohio, have invented a certain new and useful Typographical Gage, of which the following is a specification.

The object of our invention is to provide an improved typographical gage, and our invention consists in the gage hereinafter described and claimed.

Figure 1:
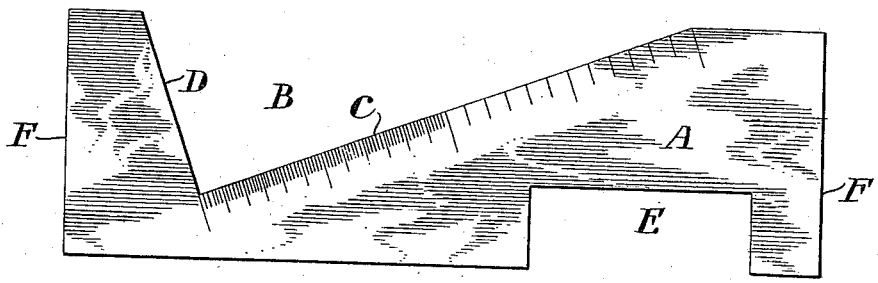
Figure 2:
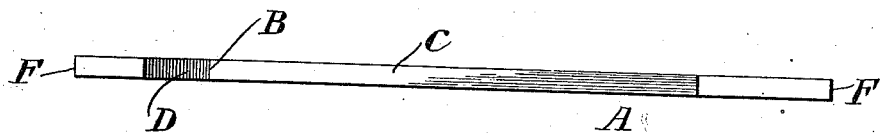

In the drawings Figure 1 is an enlarged side elevation of a gage embodying our invention; and Fig. 2, a top plan view of the same.

The gage consists of a flat plate A provided at one side, with an angular notch B having sides C and D at right angles to each other. The side C is of a height equal to two standard typographical inches or 1.992 actual inches, and is provided with a typographical scale as shown. At the other side the plate A is provided with a rectangular notch E having a width equal to the standard height of type or .918 inches. The ends F of the plate A are made at right angles to the edges and the width of the plate is made equal to the standard height of type or .918 inches. The length of the plate A is preferably equal to three typographical inches, or 2.988 actual inches.

In use the side D may be used as an abutment against which the type bodies may be placed for measurement on side C as a scale, and thus the width, length, or body of any typographical body or any fraction thereof may be readily determined. The width of the gage may be utilized to measure the space to receive the standard height of the type and the ends F in conjunction with the edges of plate, may be utilized as a square.

We claim as our invention:

1. A typographical gage consisting of a flat plate having a width equal to the standard height of type, an angular notch in said plate having sides at right angles to each other, one of said sides being provided with a typographical scale and a notch in said plate having a width equal to the standard height of type, substantially as specified.

2. A typographical gage consisting of a flat plate having a width equal to the standard height of type, an angular notch in said plate having sides at right angles to each other, one of said sides being provided with a typographical scale; a notch in said plate having a width equal to the standard height of type, and the ends of said plate being at right angles to the edges thereof, substantially as specified.

GEO. H. RIEHL.
           WERNER HONEGGER.

Witnesses:
    BRAYTON G. RICHARDS,
    JULIA SOAPER.

---

Copies of this patent may be obtained for five cents each, by addressing the "Commissioner of Patents Washington, D. C."